US009165244B2

(12) United States Patent
Reimann et al.

(10) Patent No.: US 9,165,244 B2
(45) Date of Patent: Oct. 20, 2015

(54) STRUCTURAL TO FUNCTIONAL SYNAPTIC CONVERSION

(71) Applicant: Ecole Polytechnique Federale De Lausanne (EPFL), Lausanne (CH)

(72) Inventors: Michael Reimann, Ecublens (CH); Henry Markram, Lausanne (CH); Felix Schürmann, Lausanne (CH); Eilif Benjamin Muller, Ecublens (CH); Sean Lewis Hill, Lausanne (CH); James Gonzalo King, Lausanne (CH)

(73) Assignee: Ecole Polytechnique Federale De Lausanne (EPFL)

( * ) Notice: Subject to any disclaimer, the term of this patent is extended or adjusted under 35 U.S.C. 154(b) by 304 days.

(21) Appl. No.: 13/796,285

(22) Filed: Mar. 12, 2013

(65) Prior Publication Data

US 2014/0108315 A1    Apr. 17, 2014

Related U.S. Application Data

(60) Provisional application No. 61/712,957, filed on Oct. 12, 2012.

(51) Int. Cl.
*G06E 1/00* (2006.01)
*G06N 3/04* (2006.01)
*G06N 3/10* (2006.01)

(52) U.S. Cl.
CPC .............. *G06N 3/0472* (2013.01); *G06N 3/10* (2013.01)

(58) Field of Classification Search
CPC .................................................. G06N 3/00
See application file for complete search history.

(56) References Cited

U.S. PATENT DOCUMENTS

| | | | |
|---|---|---|---|
| 2006/0008800 A1 * | 1/2006 | Rosenmund et al. | 435/6 |
| 2007/0094481 A1 * | 4/2007 | Snook et al. | 712/200 |
| 2013/0218821 A1 * | 8/2013 | Szatmary et al. | 706/25 |
| 2014/0081895 A1 * | 3/2014 | Coenen et al. | 706/25 |

* cited by examiner

*Primary Examiner* — Alan Chen
(74) *Attorney, Agent, or Firm* — Fish & Richardson P.C.

(57) ABSTRACT

Computer-implemented methods, software, and systems for determining functional synapses from given structural touches between cells in a neuronal circuit are described. One computer-implemented method for determining functional synapses from predetermined synapses of connections between two cells in a neuronal circuit, includes determining, from the predetermined synapses, the functional synapses by leaving a portion of the connections unused, e.g. for activation by plasticity mechanisms.

19 Claims, 6 Drawing Sheets

STRUCTURAL TO FUNCTIONAL SYNAPTIC CONVERSION

CROSS-REFERENCE TO RELATED APPLICATION

This application claims the benefit of U.S. Provisional Application Ser. No. 61/712,957, filed on Oct. 12, 2012, which is incorporated by reference.

TECHNICAL FIELD

The present disclosure relates to computer-implemented methods, software, and systems for determining functional synapses from given structural touches between cells in a neuronal circuit.

BACKGROUND

A multitude of experiments over the past century have yielded insights into cellular and synaptic organization of the microcircuitry of the neocortex and to its possible role as a functional unit—a column of six layers of cells. The available data is, however, highly fragmented and often conflicting. More importantly, the gaps in our knowledge of neocortical column are so large that it would require an impractical number of experiments to fill all of them.

A model of a neuronal circuit may need to account for known features of synaptic connectivity, i.e. the connectome of the local microcircuit. Since there is a vast number of potential classes of synaptic pathways, only a handful have been anatomically characterized. In the context of neuronal circuits, structural connectivity is often different from functional connectivity.

SUMMARY

The present disclosure describes one or more aspects, implementations and embodiments involving devices, systems and methods for determining functional synapses from given structural touches between cells in a neuronal circuit. In the context of neuronal circuits, structural connectivity is often different from functional connectivity. This leads to the need for a computer model that determines the subset of structural connectivity for functional activation.

One or more of the following aspects of this disclosure can be implemented or embodied alone or in combination as methods that include the corresponding operations. One or more of the following aspects of this disclosure can be implemented or embodied alone or in combination in a system comprising a processor that is configured to perform operations according to the one or more of the following aspects. One or more of the following aspects of this disclosure can be implemented or embodied alone or in combination on a computer-readable medium having instructions stored thereon that, when executed by a processor, cause the processor to perform operations according to the one or more of the following aspects.

In aspect 1, a system for determining functional synapses from predetermined synapses of connections between two cells in a neuronal circuit, comprises: a processor configured to determine, from the predetermined synapses, the functional synapses by leaving a portion of the connections unused optionally for activation by plasticity mechanisms.

Aspect 2 according to aspect 1, wherein the processor is further configured to determine the predetermined synapses by: admitting, in a first step with a first probability, given structural touches to a second step as potential synapses, followed by selecting, with a second probability in the second step, synapses of the potential synapses as predetermined synapses, wherein the second probability depends on a number of the potential synapses.

Aspect 3 according to any one of aspects 1 to 2, wherein the predetermined synapses are selected as the functional synapses with a third probability, wherein the third probability is independent of a number of the predetermined synapses.

Aspect 4 according to any one of aspects 2 to 3, wherein the first probability is calculated using at least one of experimental data on bouton density, experimental data on the (e.g., mean) number of the synapses per connection and a number of the given structural touches.

Aspect 5 according to any one of aspects 2 to 4, wherein the second probability increases with increasing number of the synapses admitted in the first step to the second step and/or wherein the second probability is constant for the number of the synapses admitted in the first step to the second step being larger than a cut-off number and/or wherein the second probability is a monotonically increasing function of the number of potential synapses that approaches zero (e.g., between 0 and 0.1) for the number being lower than the cut-off number and approaches one (e.g., between 0.9 and 1) for the number being larger than the cut-off number Aspect 6 according to any one of aspects 3 to 5, wherein the third probability leads to a number of distinct diagrams of the neuronal circuit that is larger than a predetermined threshold and/or wherein the third probability is between 0.2 and 0.8, optionally between 0.3 and 0.7, optionally between 0.4 and 0.6, optionally equal to about 0.5.

Aspect 7 according to any one of aspects 1 to 6, wherein a coefficient of variation of a distribution of a number of the functional synapses per connection is between 0.2 and 0.3, wherein the coefficient of variation is preferably equal to 0.25.

In aspect 8, a computer-implemented method for determining functional synapses from predetermined synapses of connections between two cells in a neuronal circuit, comprises: determining, from the predetermined synapses, the functional synapses by leaving a portion of the connections unused, optionally for activation by plasticity mechanisms.

Aspect 9 according to aspect 8, wherein the predetermined synapses are determined by: admitting, in a first step with a first probability, given structural touches to a second step as potential synapses, followed by selecting, with a second probability in the second step, synapses of the potential synapses as predetermined synapses, wherein the second probability depends on a number of the potential synapses.

Aspect 10 according to any one of aspects 8 to 9, wherein the predetermined synapses are selected as the functional synapses with a third probability, wherein the third probability is independent of a number of the predetermined synapses.

Aspect 11 according to any one of aspects 9 to 10, wherein the first probability is calculated using at least one of experimental data on bouton density, experimental data on the (e.g., mean) number of the synapses per connection and a number of the given structural touches.

Aspect 12 according to any one of aspects 9 to 11, wherein the second probability increases with increasing number of the synapses admitted in the first step to the second step or wherein the second probability is constant for the number of the synapses admitted in the first step to the second step being larger than a cut-off number and/or wherein the second probability is a monotonically increasing function of the number of potential synapses that approaches zero (e.g., between 0 and 0.1) for the number being lower than the cut-off number and approaches one (e.g., between 0.9 and 1) for the number being larger than the cut-off number Aspect 13 according to any one of aspects 10 to 12, wherein the third probability leads to a number of distinct diagrams of the neuronal circuit that is larger than a predetermined threshold and/or wherein the third probability is equal to about 0.5.

Aspect 14 according to any one of aspects 8 to 13, wherein a coefficient of variation of a distribution of a number of the functional synapses per connection is between 0.2 and 0.3, wherein the coefficient of variation is preferably equal to 0.25.

In aspect 15, a computer-readable medium having computer-executable instructions stored thereon that, when executed by a processor, cause the processor to perform a method for determining functional synapses from predetermined synapses of connections between two cells in a neuronal circuit, comprising: determining, from the predetermined synapses, the functional synapses by leaving a portion of the connections unused for activation by plasticity mechanisms.

Aspect 16 according to aspect 15, wherein the predetermined synapses are determined by: admitting, in a first step with a first probability, given structural touches to a second step as potential synapses, followed by selecting, with a second probability in the second step, synapses of the potential synapses as predetermined synapses, wherein the second probability depends on a number of the potential synapses.

Aspect 17 according to any one of aspects 15 to 16, wherein the predetermined synapses are selected as the functional synapses with a third probability, wherein the third probability is independent of a number of the predetermined synapses.

Aspect 18 according to any one of aspects 16 to 17, wherein the first probability is calculated using at least one of experimental data on bouton density, experimental data on the (e.g., mean) number of the synapses per connection and using a number of the given structural touches.

Aspect 19 according to any one of aspects 16 to 18, wherein the second probability increases with increasing number of the synapses admitted in the first step to the second step and/or wherein the second probability is constant for the number of the synapses admitted in the first step to the second step being larger than a cut-off number and/or wherein the second probability is a monotonically increasing function of the number of potential synapses that approaches zero (e.g., between 0 and 0.1) for the number being lower than the cut-off number and approaches one (e.g., between 0.9 and 1) for the number being larger than the cut-off number.

Aspect 20 according to any one of aspects 17 to 19, wherein the third probability leads to a number of distinct diagrams of the neuronal circuit that is larger than a predetermined threshold and/or wherein the third probability is equal to about 0.5.

Aspect 21 according to any one of aspects 15 to 20, wherein a coefficient of variation of a distribution of a number of the functional synapses per connection is between 0.2 and 0.3, wherein the coefficient of variation is preferably equal to 0.25.

In aspect 22, a system for determining functional synapses from given structural touches between two cells in a neuronal circuit, comprising a processor that is configured to perform the following operations: admitting, in a first step with a first probability, the given structural touches to a second step as potential synapses, followed by selecting, with a second probability in the second step, synapses of the potential synapses, wherein the second probability depends on a number of the potential synapses, followed by determining the functional synapses, with a third probability in a third step, from the synapses being selected in the second step by leaving a portion of the connections unused, wherein the third probability is independent of a number of the synapses being selected in the second step.

In aspect 23, that is combinable with any one of aspects 4 to 7, a system for determining functional synapses from given structural touches between two cells in a neuronal circuit, comprises a processor that is configured to perform the following operations: admitting, in a first step, the given structural touches to a second, following step with a first probability.

In aspect 24, that is combinable with any one of aspects 5 to 7 and 23, a system for determining functional synapses from given structural touches between two cells in a neuronal circuit, comprises a processor that is configured to perform the following operations: selecting, with a second probability in a second step, synapses of the potential synapses as predetermined synapses, wherein the second probability depends on a number of the potential synapses admitted in the prior first step to the second step.

In aspect 25 according to any one of aspects 23 to 24, the operations further comprising: determining the functional synapses, with a third probability in a third step after the second step, from the synapses being selected in the second step by leaving a portion of the connections unused, e.g. for activation by plasticity mechanisms In aspect 26 according to aspect 25, wherein the third probability is independent of a number of the synapses being selected in the second step and/or wherein the third probability leads to a number of distinct diagrams of the neuronal circuit that is larger than a predetermined threshold.

Aspect 27 according to any one of aspects 7, 14 and 21, wherein the distribution is a gamma distribution.

Aspect 28 according to any one of aspects 1 to 27, wherein the two cells are members of a population of cells of the neuronal circuit, wherein any two cells of the population form a pair, and wherein the pair is deemed as connected pair if the two cells of the pair are connected by one or more of the potential synapses.

Aspect 29 according to aspect 28, wherein a common neighbor of any two cells of the population is defined as a cell within the population that is connected to both of the any two cells of the population.

Aspect 30 according to aspect 29, wherein a probability for establishing a connection between any two cells of the population increases with a higher number of the common neighbors of the any two cells of the population.

Aspect 31 according to any one of aspects 29 to 30, wherein a strength of one or more of the connections between two cells of a connected pair within the population is higher for a larger number of the common neighbors of the two cells of the connected pair.

Aspect 32 according to any one of aspects 29 to 31, wherein a common neighbor bias is defined as a ration of a mean number of the common neighbors of the connected pairs and a mean number of the common neighbors of the pairs within the population.

Aspect 33 according to aspect 32, wherein the common neighbor bias is equal to a value of between about 1.6 and about 2, preferable is equal to a value of about 1.8.

The subject-matter described in this specification can be implemented in particular implementations or embodiments so as to realize one or more of the following advantages.

First, a computer-implemented model of neuronal connectivity is provided that allows to mimic neuronal connectivity that may help to find sources of neural diseases and may contribute to in-silico experiments, e.g. for identifying potential ways for treatment of the neural diseases.

Second, a neuronal connectome is derived and modeled informatically. This may allow computer developers to learn from neuronal circuits of a brain to improve semiconductor-based processors.

Third, a model of neuronal connectivity with room for plasticity is provided. This may allow to explore how distinct reconstructions of a neuronal circuit affect a connectome of the circuit. The model may allow using connections in the pool as candidates that may be studied during structural plasticity mechanisms.

Fourth, a neuronal model of a connectome is provided that may be robust against details of neuronal touch detection.

Fifth, the neuronal model may allow finding optimal parameters (e.g., the probabilities or probability function mentioned below) for each pathway or connection individually.

The details of one or more implementations of the subject matter of this specification are set forth in the accompanying drawings and the description below. Other features, aspects, and advantages of the subject matter will become apparent from the description, the drawings, and the claims.

Reference numbers and designations in the various drawings indicate exemplary aspects, implementations or embodiments of particular features of the present disclosure.

DETAILED DESCRIPTION

The disclosure generally describes computer-implemented methods, software, and systems determining functional synapses from given structural touches between cells in a neuronal circuit.

Figure 1:
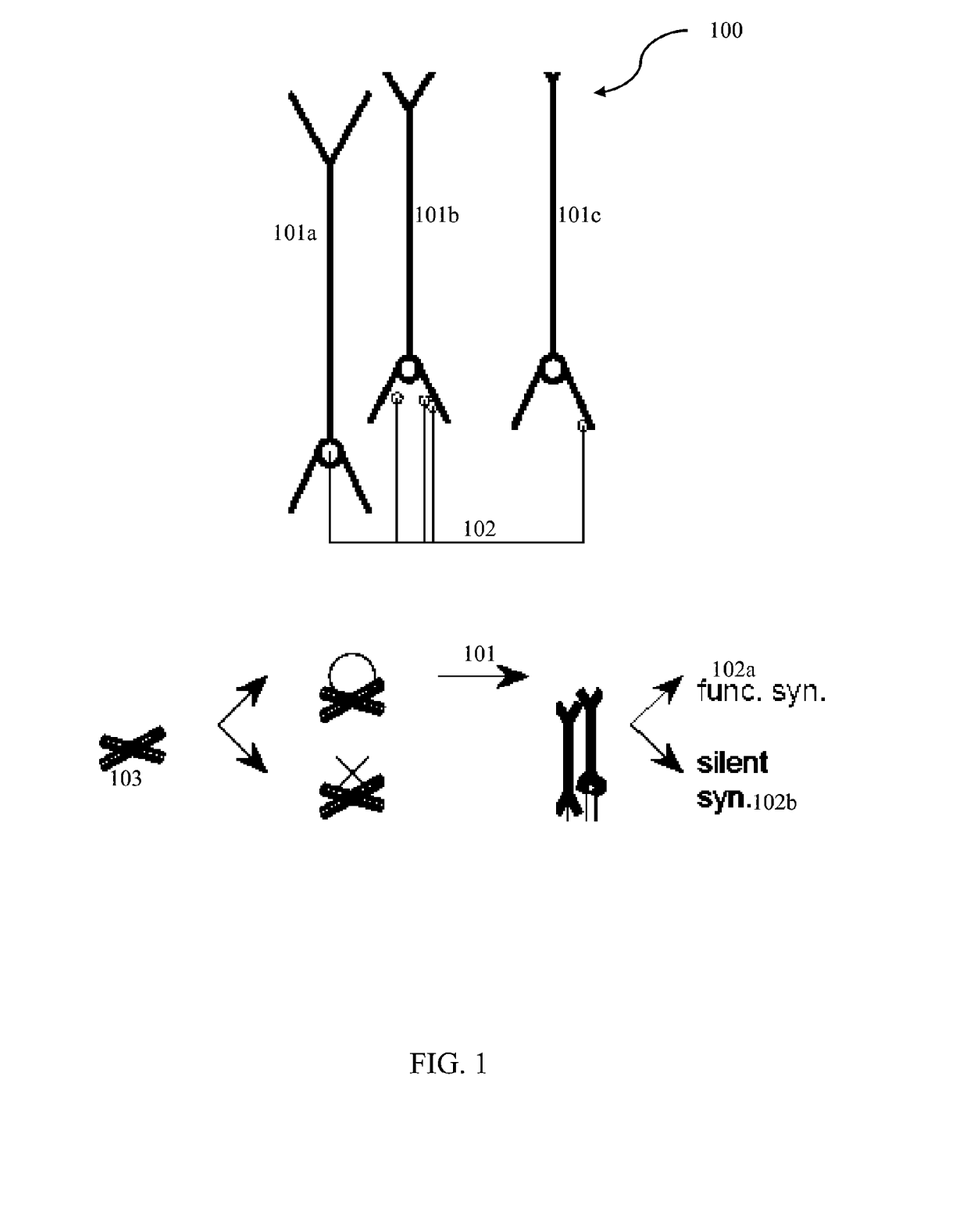
FIG. 1 illustrates an exemplary neuronal network at a high level.

FIG. 1 illustrates an exemplary neuronal network (100) or connectome at a high level. For example, a neuronal circuit (e.g., a microcircuit), may comprise two or more neuronal cells (101a-c) which are connected by one or more connections (102) in between the cells (101a-c). For example, 55 morphological types of neuronal cells in a neocortical column may render 3025 potentially synaptic connections (e.g., synaptic pathways). Only a few of these synaptic connections have been systematically characterized and most of them may remain uncharacterized. To accelerate mapping of the connections, a computer-implemented model of a connectome is described herein. In general, most neurons (101a-c) in the column are structurally (e.g., via physical touch) in contact (103) with most of other neuronal cells (101a-c). In an aspect of the subject-matter described herein, a subset of the neuronal cells (101a-c) that form functional synaptic connections (102a) may be selected, wherein silent (e.g. inactive or unused) synaptic connections (102b) may be deselected (e.g., omitted or kept for later activation). For the purpose of this disclosure, the term "functional synapse" may relate to artificial synapses of a computer-based model. Such "functional synapse" may act to some degree similar to or like biological functional synapses from actual neuronal circuits of a brain. For the purpose of this disclosure, the term "neuronal cell" may refer to an artificial cell that is configured to act to some degree like an actual biological neuronal cell (e.g., a neuron). The two or more neuronal cells described herein, depending on the size of the neuronal circuit, optionally are between 1 and $10^{12}$ neuronal cells, optionally are about $10^{11}$ neuronal cells, optionally are between 1 and $10^9$ neuronal cells, optionally are about $10^8$ neuronal cells, optionally are about $10^6$ neuronal cells, optionally are between 1 and $10^5$ neuronal cells, optionally are about 30,000 neuronal cells.

Figure 2:
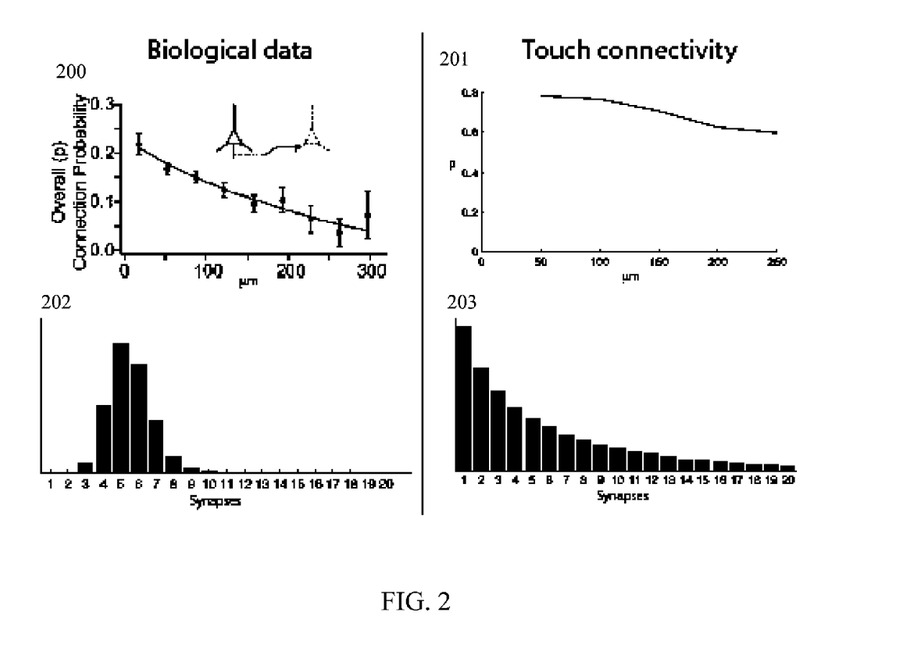
FIG. 2 illustrates discrepancies between biological data and determining synaptic connections only based on physical touch detection of neuronal cells.

FIG. 2 illustrates discrepancies between biological data (200, 202) and determining synaptic connections only based on physical touch detection (201, 203) between neuronal cells. For instance, the experimental overall connection probability as a function of distance between two neuronal cells (101a-c) significantly decreases with increasing distance. However, the connection probability based on the touch detection decreases only slightly with increasing distance and may be overall higher. For example, a distribution of a number of synapses per connection between two neuronal cells (101a-c) shows an exponential behavior in case of the touch detection (203) while the distribution of the number of synapses per connection between two neuronal cells (101a-c) shows a gamma-function or Gaussian-function-like behavior in case of the biological data (202). In an aspect, a more advanced model may be required to provide computer developers with a (e.g., more realistic) model to learn from plasticity (e.g., human learning mechanisms) in a brain for potential improvements of semiconductor circuits in computer processors.

Figure 3:
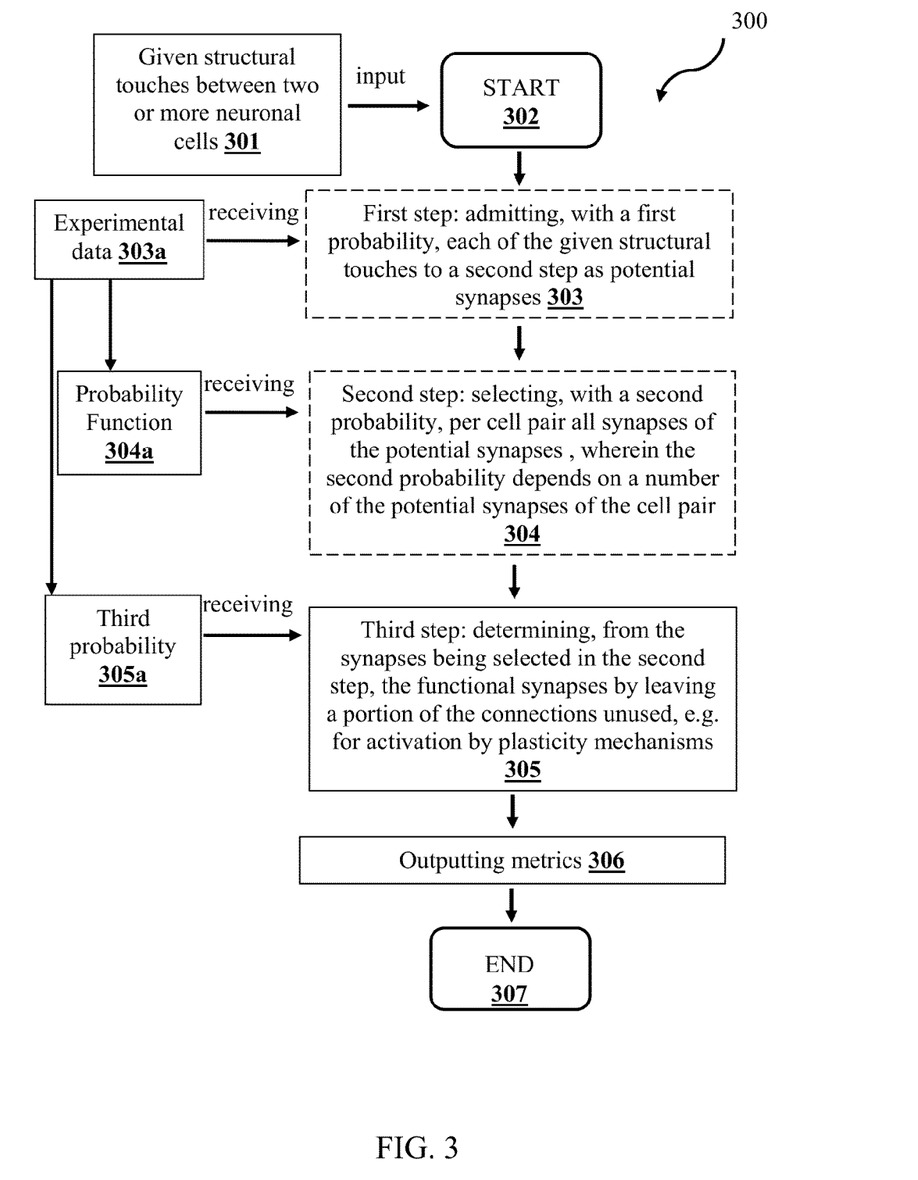
FIG. 3 illustrates exemplary computer-implemented model for deriving a neuronal connectome.

FIG. 3 illustrates exemplary computer-implemented model (300) for simulating a neuronal connectome. In a general aspect of the subject-matter described herein, a computer-implemented method (300) for determining functional synapses from predetermined synapses of connections between two cells in a neuronal circuit, comprises: determining (305), from the predetermined synapses, the functional synapses by leaving a portion of the connections unused, optionally for activation by plasticity mechanisms. One or more of the following aspects may be implemented with the general aspect described above. In an aspect, before the method or model starts (302), the given structural touches (301) between the two (or more) neuronal cells may be received as input, for example the given structural touches (301) may be received from touch detection mechanisms and my comprise locations and/or morphologies of the given structural touches (301). In an aspect, the predetermined synapses may be determined by: admitting, in a first step (303), given structural touches (301) to a second step (304) as potential synapses with a first probability, followed by selecting, with a second probability in the second step (304), synapses (e.g., all synapses) of the potential synapses (admitted in the first step (303) to the second step (304)) as predetermined synapses, wherein the second probability depends on a number of the potential synapses admitted in the first step (303) to the second step. In an aspect, the predetermined synapses may be the synapses selected in the second step (304) and these predetermined synapses may further be selected or determined (305) as the functional synapses with a third probability (305a) (e.g. in a third step), wherein the third probability (305a) is independent of a number of the predetermined synapses. For example, a portion (e.g., every second) of the synapse being selected in the second step (304) may be determined to be among the functional synapses in the third step (305). The determination of the functional synapses in the third step may allow to simultaneously choose a target 1) mean, 2) standard deviation, and 3) bouton-density of the presynaptic cell type (and e.g. pathway or connection specific) and may form an advantage over alternative strategies.

In an aspect, the first probability may be calculated using at least one of experimental data (303a) on bouton density, experimental data on the (e.g., mean) number of synapses per connection and a number of the given structural touches, e.g. per connection. In an aspect, the second probability may be a probability function (304a) (e.g., a sigmoidal or step function as function of the synapse number per connection as independent variable) that depends on the number of potential synapses per connection between the two neuronal cells, and wherein the probability may increase with increasing number of the synapses admitted in the first step to the second step and/or wherein the second probability may be constant for the number of the synapses admitted in the first step to the second step being larger than a cut-off number. The probability function (304a) may be determined based on experimental data (303a). In an aspect, the third probability (305a) may lead to a number of distinct diagrams of the neuronal circuit above a predetermined threshold (e.g., wherein an increasing number of the distinct diagrams is more favorable) and/or the third probability may be equal to about 0.5. For example, the third probability may yield a maximum of the number of distinct diagrams of the neuronal circuit. The third probability may be determined based on experimental data (303a). These three steps in FIG. 3 may be performed alone or in any combination thereof in the model. For example the first and second step may be omitted to still provide some of the advantages described herein.

In an aspect, one or more metrics (e.g., mean and standard deviation of the number of, e.g. functional, synapses, connection probability or bouton density) may be outputted (307) by the method or model (300). In an aspect, a coefficient of variation of a distribution (e.g., that is outputted (306) as a part of the metrics) of a number of the synapses (e.g., functional synapses) per connection (e.g., for multiple neuronal cells included in the neuronal circuit) may be between 0.2 and 0.3, wherein the coefficient of variation may be preferably equal to 0.25 and may be a part of the input receiving in the experimental data (303a).

In other words, the model described herein, e.g. in context of FIG. 3, may deselect structural touches in three steps using parameters to determine the degree of deselection based on the properties of the structural connectome (e.g., given structural touches) and available biological data (such as the mean and standard deviation of the number of synapses per connection and bouton densities): 1. Step—a fraction of appositions may randomly be deselected because their exponential distribution has a long tail of high appositions per connection which is not found in biological data; 2. Step—a sigmoidal distribution may describe the probability of a potential synapse to advance to the next step; 3. Step—a fraction of the remaining multi-synapse connections may be removed in order to satisfy the biological bouton density from biological data. The model described herein in context of FIG. 3 may allow the derived connectome to become more accurate as pre- and post-synaptic data becomes available for specific synaptic connections or pathways, and as specific exceptions to the applied steps become evident. The neuronal model may provide room for plasticity. This may allow to explore how distinct reconstructions of a neuronal circuit affect a connectome of the circuit. The model may allow using connections in the pool as candidates that may be studied during structural plasticity mechanisms.

Figure 4:
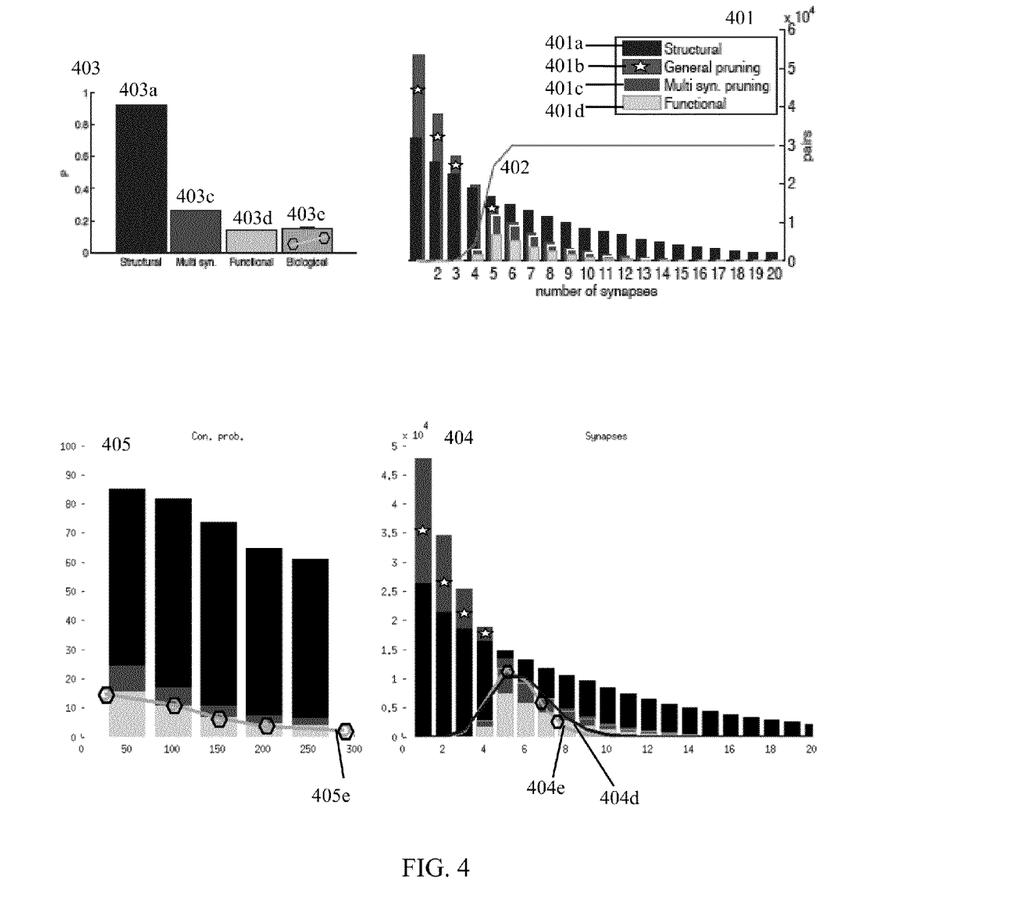
FIG. 4 illustrates exemplary metrics that may be outputted by the model described in context of FIG. 3

FIG. 4 illustrates exemplary metrics that may be outputted by the model (300) described in context of FIG. 3. Among the outputted metrics may be a computed connection probability (403, 405) that provides the probability of two cells in the neuronal circuit establishing a synaptic connection. This connection probability may be computed (405) as a function of distance in μm between the two neuronal cells of the neuronal circuit. The given synapses may yield a connection probability based on purely structural considerations and may be much higher (e.g., close to 1) than the connection probability at the model output (403c, 403d). The connection probability may be outputted after the first and second step (403c) as described in context of FIG. 3. In an aspect, the connection probability may be outputted also after the third step (403d). These connection probabilities (403, 405) may be compared with biological data (403e, 405e) (e.g., experimental data), wherein the connection probability after the third step (403c) may be closer to the biological data (403e, 405e) compared to the connection probabilities computed after the first and second step (403c).

Another outputted metric may be the distribution (401, 404) of synapses per connection between two neuronal cells in the neuronal circuit. For example, this distribution may be outputted after the first (401b), second (401c) or after the third (401d) step. These steps may be performed alone or in any combination thereof in the model. The given structural touches (401a) may yield the distribution of synapses per connection based on purely structural considerations (e.g., touch detection as mentioned above) and may be higher (e.g., following an exponential function) than the values of the distribution at the model output (401b, 401c, 401d). The output for the distribution after the second and/or the third (404d) step may be Gaussian- or gamma function-like. A coefficient of variation (ratio of standard deviation over the mean) of the distribution (of a number of the synapses) outputted after the third step (e.g., providing a distribution of the functional synapses per connection) may be between 0.2 and 0.3, wherein the coefficient of variation may be preferably equal to 0.25, which approximately matches the biological distribution (404e) that is also approximately Gaussian- or gamma function-like. In an aspect, the second probability increases with increasing number of the synapses admitted in the first step to the second step and/or wherein the second probability is constant for the number of the synapses admitted in the first step to the second step being larger than a cut-off number. FIG. 4 illustrates one of such an exemplary function (402) for the second probability that may be applied in step (304a) of FIG. 3. For instance, the shape of the function (402) may be sigmoidal with a shift along the axis of the number of synapses that is specified by cut-off number $\mu_2$ (for example: $\mu_2=2.8$ as shown in FIG. 4) and with a width of the transition set to 0.25 times $\mu_2$. This may transform the exponential distribution into the Gaussian- or gamma function-like distribution. The neuronal model of a connectome described herein may be robust against details of neuronal touch detection or structural deviations in the morphology on which the method of the model is applied to.

The following aspects may provide an exemplary implementation or embodiment of the model described in context of FIGS. 3, 4. Specifically, how the parameters involved in the model may be computed. One or more of the following aspects or implementations may be combined with the aspects described in FIG. 3 or 4. The three steps of the model may change the values of the metrics that are configured to be outputted, e.g. mean and standard deviation of the number of synapses per connection, connection probability and/or bouton density. This change may be defined as a product of the changes occurring in each (1, 2, 3) step separately:

$$\frac{b_f}{b_s} = c_b = c_b^1 \cdot c_b^2 \cdot c_b^3 \quad (1)$$

$$\frac{m_f}{m_s} = c_m = c_m^1 \cdot c_m^2 \cdot c_m^3 \quad (2)$$

$$\frac{d_f}{d_s} = c_d = c_d^1 \cdot c_d^2 \cdot c_d^3 \quad (3)$$

$$\frac{p_f}{p_s} = c_p = c_p^1 \cdot c_p^2 \cdot c_p^3 \quad (4)$$

In the above equations (1) to (4), $b_s$, $b_f$ refer to the mean bouton density of a presynaptic population in the population of the given structural touches and in the modeled circuit, e.g. after the third step. Likewise $m_s$, $m_s$, $d_s$, $d_f$, $p_s$ and $p_f$ refer to the mean number of synapses m, standard deviation d and connection probability p based on the given structural touches and the modeled circuit (e.g., structural and functional neuronal circuits). The parameter c denotes the change in the values from before applying the model to the values imposed by the model described in context of, e.g., FIGS. 3, 4.

In an aspect, the distribution of the number of synapses (e.g., the number of extra synapses beyond the first one establishing the connection between the two neuronal cells) in the population of the given structural touches (here denoted as the structural circuit) may follow an exponential distribution for all connections (e.g., pathways):

$$S_0(x+1) = \frac{N}{m_s - 1} \cdot \exp\left(\frac{-x}{m_s - 1}\right) \quad (5)$$

In the above equation (5), N is the total number of connected cell pairs in the structural circuit and x is the number of synapses (e.g., extra synapses).

In an aspect, the first step of the model may reduce the number of synapses per connection by a factor (first probability) of $p_1$, keeping it exponential:

$$S_0(x+1) = \frac{N}{p_1 \cdot (m_s - 1)} \cdot \exp\left(\frac{-x}{p_1 \cdot (m_s - 1)}\right) \quad (6)$$

From this may follow for the change values c of the third step:

$$c_m^1 = p_1 + \frac{1 - p_1}{m_s} \quad (7)$$

$$c_d^1 = p_1 \quad (8)$$

$$c_b^1 = p_1 \quad (9)$$

In an aspect, the cut-off number μ is employed for the second step. In an aspect, a hard cut-off (e.g., a step function) or a sigmoidal function may be considered for the second probability $p_2$. These exemplary functions may be characterized by effectively cutting the left side (e.g., the low synapse numbers per connection) of the distribution (401) of the outputted metrics (e.g., as shown in FIG. 4) while keeping the exponential behavior of the right side (e.g, the higher synapse numbers per connection):

$$S_2(x+1) = \frac{S_1(\mu)}{S_1(1)} \cdot S_1(x - \mu + 1) \quad (10)$$

$$= \exp\left(\frac{\mu - 1}{p_1 \cdot (m_s - 1)}\right) \cdot \frac{N}{p_1 \cdot (m_s - 1)} \cdot \exp\left(\frac{x - \mu + 1}{p_1 \cdot (m_s - 1)}\right)$$

This may essentially shift the mean of the distribution by μ−1 to the right, leading to:

$$c_m^2 = \frac{c_m^1 \cdot m_s + \mu - 1}{c_m^1 \cdot m_s} = 1 + \frac{\mu - 1}{p_1 \cdot (m_s - 1) + 1}, \quad (11)$$

for $$\mu \geq 1$$

$$c_d^2 = 1 \quad (12)$$

wherein the standard deviation d remains unchanged. FIG. 4 illustrates one of such an exemplary function (402) for the second probability. These probability functions may be applied as second probability to the population of synapses that are admitted in the first step to the second step as described in context of, e.g., FIG. 3. In an aspect, a reduction in bouton density may be achieved by first substitute some constants and parameters:

$$Z = p_1 \cdot (m_s - 1) \rightarrow S_1(x+1) = \frac{N}{Z} \cdot \exp\left(-\frac{x}{Z}\right) \quad (13)$$

In an aspect, the amount of synapses in connections with x+1 synapses may be equal to the number of connections at that point, multiplied by the number of synapses:

$$T_1(x+1) = (x+1) \cdot \frac{N}{Z} \cdot \exp\left(-\frac{x}{Z}\right) \quad (14)$$

In an aspect, this may lead to the number of synapses that are lost through applying of the probability function:

$$\int_0^{\mu - 1} (x+1) \cdot \frac{N}{Z} \cdot \exp\left(-\frac{x}{Z}\right) dx = \quad (15)$$

$$-N \cdot (\mu + Z) \cdot \exp\left(-\frac{\mu - 1}{Z}\right) + N \cdot (Z + 1)$$

$$c_b^2(\mu) = \quad (16)$$

$$\frac{Z + \mu}{Z} \cdot \exp\left(-\frac{\mu - 1}{Z}\right) = \frac{p_1 \cdot (m_s - 1) + \mu}{p_1 \cdot (m_s - 1)} \cdot \exp\left(-\frac{\mu - 1}{p_1 \cdot (m_s - 1)}\right),$$

for $\mu \geq 1$ wherein N·Z is the total number of synapses surviving the second step after applying the probability function.

In an aspect, the third probability may be introduced to take into account for an important physiological function: The third probability in the third step described herein may allow space for structural plasticity mechanisms to change the wiring diagram of the neuronal circuit. This may leave a pool of unused (e.g., inactive or silent) synaptic connections for activation (e.g. rewiring, establishing new connections for signal transmission, e.g. transmission of activation potentials etc.) by plasticity mechanism so that significant changes to the wiring diagram may occur. If homeostatic mechanisms are applied to the neuronal circuit, one may derive deactivation of connections to occur about as often as activations while the overall number of connections remains fairly constant. The potential for rewiring C, i.e. the number of distinct wiring diagrams that may be reached depend on the third probability $a_3$:

$$|C| = \binom{a_3}{M} \tag{17}$$

$$c_b^3 = a_3, c_m^3 = 1, c_d^3 = 1 \tag{18}$$

In equation (17), M refers to a number of synaptic connections surviving after the first and second step of the model. In an aspect, a value for $a_3$ of about 0.5 may maximize the potential for rewiring. In an aspect, the determination of the functional synapses in the third step may allow to simultaneously choose a target 1) mean, 2) standard deviation, and 3) bouton-density of the presynaptic cell type (and e.g. pathway or connection specific) and may form an advantage over alternative strategies.

In an aspect, the reduction in connection probability may be derived from the reduction in bouton density and mean number of synapses. The connection probability may be proportional to the total number of connections and the bouton density may be proportional to the total number of boutons. The total number of boutons may be equal to the total number of connections multiplied with the mean number of synapses per connection. As one may consider the change in these metrics, proportionality may become equality in Eq. 19:

$$c_p = \frac{c_b}{c_m} \tag{19}$$

$$\frac{p_1}{c_m} = 0.25 \tag{20}$$

In an aspect, the ratio of the standard deviation over the mean (coefficient of variation, Eq. 20) of the distribution of synapse numbers as described, e.g., in FIG. 4 may be set to about 0.25 based on biological data. Combining and simplifying the above equations may yield the parameters employed in the three steps of the model described herein, e.g., in context of FIG. 3:

$$p_1 \approx \frac{c_b \cdot (m_s - 1)}{4 \cdot m_s \cdot a_3} \cdot \exp(3) \tag{21}$$

$$\mu_2 = p_1 \cdot (3 \cdot m_s + 1) \tag{22}$$

$$a_3 \approx \frac{c_p(m_s - 1)}{c_m \cdot m_s} \cdot \exp\left(\frac{c_m - c_d}{c_d}\right) \tag{23}$$

In an aspect, a common neighbor of any two cells of the population is defined as a cell within the population that is connected to both of the any two cells of the population. In an aspect, a probability for establishing a connection between any two cells of the population increases with a higher number of the common neighbors of the any two cells of the population.

In an aspect, a strength of one or more of the connections between two cells of a connected pair within the population is higher for a larger number of the common neighbors of the two cells of the connected pair.

In an aspect the number of common neighbors of a pair of cells $\{C_i, C_j\}$ may be defined as the number of cells in the rest of the population that are connected to $C_i$. For example, one may consider the number of common presynaptic neighbors $CN_{pre}$, a connection matrix M:

$$CN_{pre}(i,j) = |\{C_x, C_x \to C_i \cap C_x \to C_j\}| \tag{24}$$

$$M_{x,y} = 1, \text{ if } C_x \to C_y, 0 \text{ else} \tag{25}$$

$$CN_{pre} = M \cdot M^T \tag{26}$$

In equation (25), the arrow denotes the relation that a neuronal cell is presynaptic to another cell. The number of common (presynaptic) neighbors may be computed from the connection matrix M as shown in Eq. 25. The matrix of common (presynaptic) neighbors may be computed by a matrix multiplication as described in Eq. 26. In an aspect, the common neighbor bias CB may be defined as the ratio of the mean number of common neighbors of connected pairs and the mean number of common neighbors in the full neuronal network within the neuronal circuit:

$$CB = \frac{sum\ (CN_{pre} * M)}{sum\ (M)} \cdot \frac{N \cdot (N-1)}{sum\ (CN_{pre})} \tag{27}$$

In equation (27), the * denotes a pointwise product and "sum" returns the sum of all elements of a matrix except the main diagonal.

For example, the CB according to the model described herein, e.g. in context of FIG. 3, may reproduce the experimentally obtained CB value of 1.8 for a population of thick tufted pyramidal cells of layer 5 in a cortical column.

Figure 5:
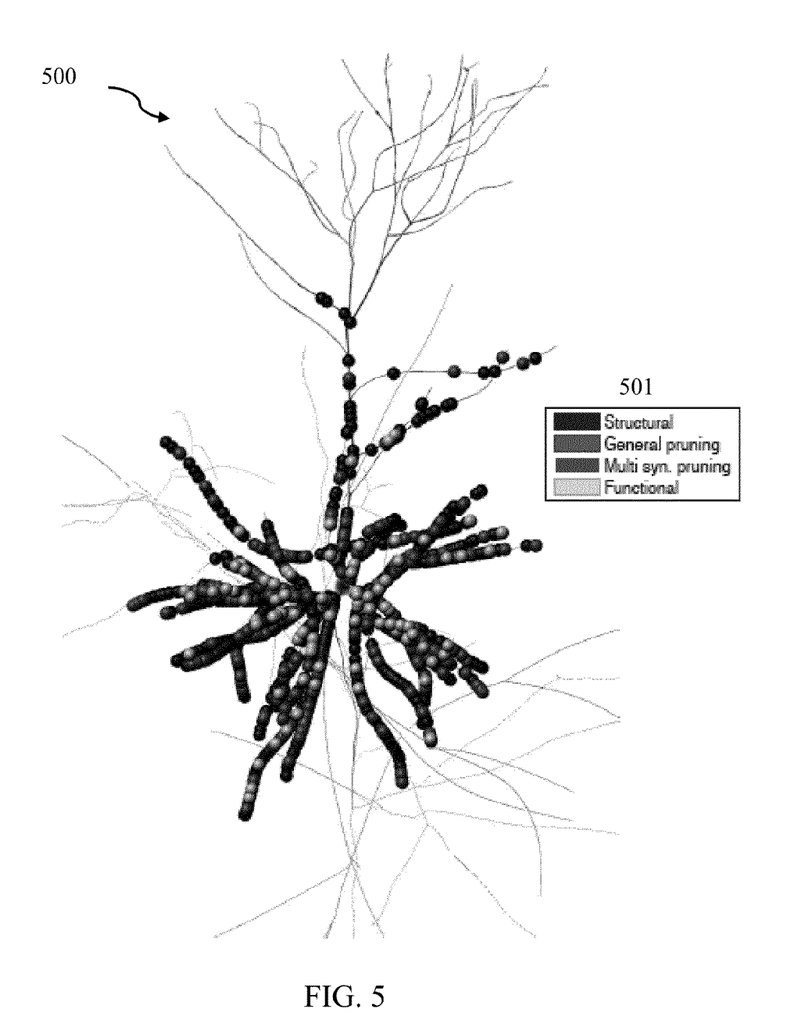
FIG. 5 illustrates shows innervation from layer 4 spiny stellate (L4_SS) neuronal cell onto layer 2/3 pyramidal neuronal cell (L23_PC) outputted by the computer-implemented model described herein.

FIG. 5 illustrates an exemplary output for a neuronal cell 500 from the model described above, e.g. in context of FIG. 3. FIG. 5 shows innervation from L4_SS neuronal cells onto L23_PC, wherein the legend 501 specifies which synapse locations remain or are selected after which step of the model. The legend 501 is identical with the color coding in FIG. 4. Physical touches are pruned in three stages according to one or more aspects of the model described above: general individual pruning, multi-synapse pruning and connection pruning allowing for plasticity mechanisms to take place.

Figure 6:
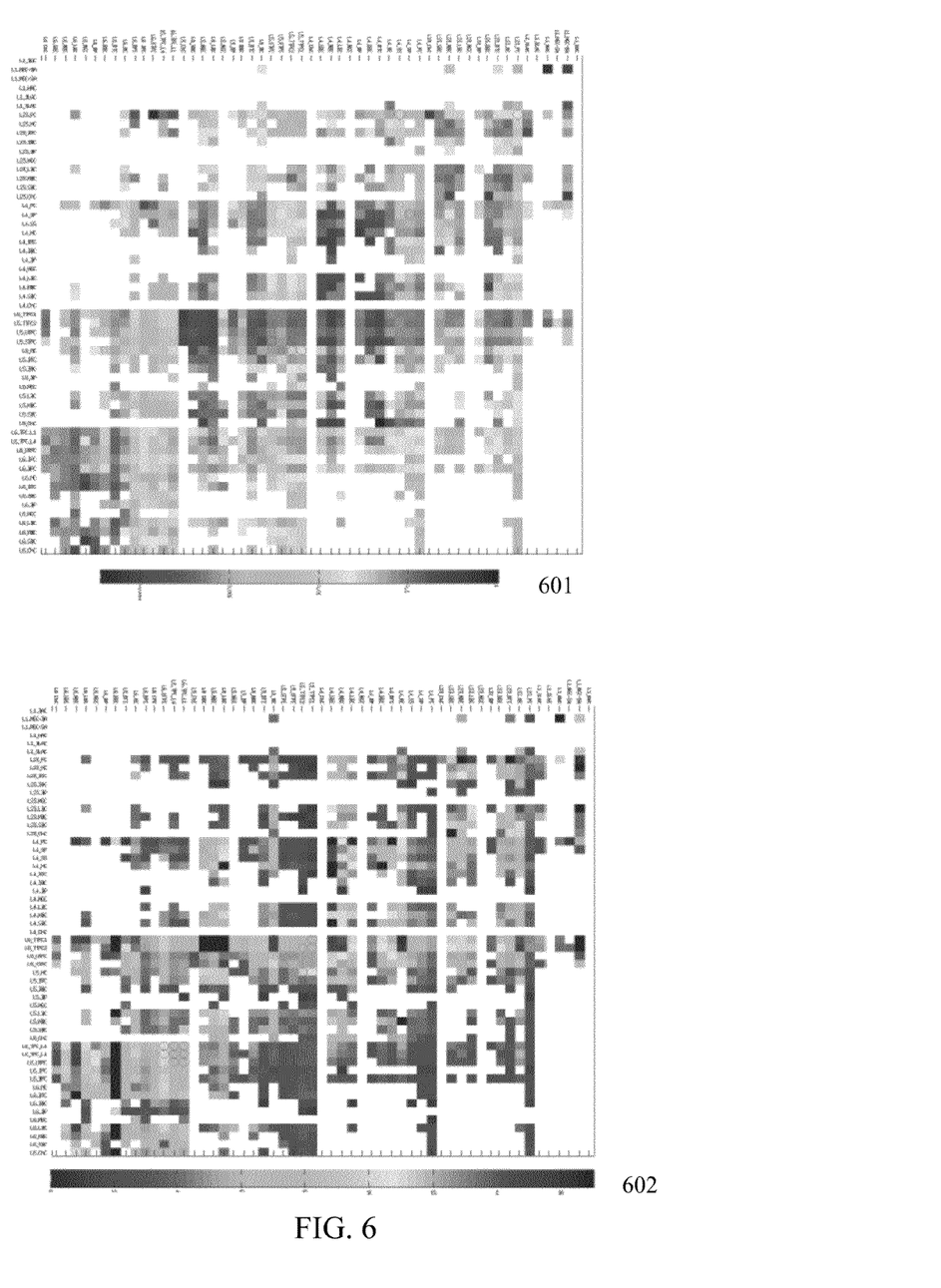
FIG. 6 illustrates exemplary two-dimensional maps of predicted connection probabilities and predicted number of synapses per connection of pairs of cells.

FIG. 6 illustrates exemplary two-dimensional maps of predicted connection probabilities (601) and predicted number (602) of synapses per connection of pairs, both within 100 μm distance between the two cells of the pairs. In this example, absolute connection probabilities (601) are indicated grayscale coded, wherein the presynaptic morphology type is listed along the horizontal, the postsynaptic type along the vertical axis. Furthermore, the mean number (602) of synapses is indicated as grayscale code. The presynaptic morphology type is listed along the horizontal, the postsynaptic type along the vertical axis.

At a high level, computer or processor comprises an electronic computing unit (e.g., a processor) operable to receive, transmit, process, store, or manage data and information associated with an operating environment. As used in the present disclosure, the term "computer" or "processor" is intended to encompass any suitable processing device. For instance, computer or processor may be a desktop or a laptop computer, a cellular phone, a smartphone, a personal digital assistant, a tablet computer, an e-book reader or a mobile player of media such as a mp3 player or a CD player. The term "processor" may also relate to a computing device including more than one processors or cores. The term "processor" is to be understood as being a single processor that is configured to perform operations as defined by one or more aspects described in this disclosure, or the "processor" comprises two or more processors, that are configured to perform the same operations, e.g. in a manner that the operations are distributed among the two or more processors. This may allow to process the operations parallel by the two or more processors. The two or more processor may be arranged within a supercomputer, the supercomputer may comprises multiple cores allowing for parallel processing of the operations. Furthermore, the operating environment can be implemented using any number of servers, as well as computers other than servers, including a server pool. Indeed, the computer or processor and the server may be any computer or processing device such as, for example, a blade server, general-purpose personal computer (PC), Macintosh, workstation, UNIX-based workstation, or any other suitable device. In other words, the present disclosure contemplates computers other than general purpose computers, as well as computers without conventional operating systems. Further, the computer, processor and server may be adapted to execute any operating system, including Linux, UNIX, Windows, Mac OS, iOS, Android or any other suitable operating system.

The term "computing device", "server" or "processor" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array), a CUDA (Compute Unified Device Architecture) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and operating environment can realize various different computing model infrastructures.

Regardless of the particular implementation, "software" may include computer-readable instructions, firmware, wired or programmed hardware, or any combination thereof on a tangible and non-transitory medium operable when executed to perform at least the processes and operations described herein. Indeed, each software component may be fully or partially written or described in any appropriate computer language including C, C++, Java, Visual Basic, assembler, Python and R, Perl, any suitable version of 4GL, as well as others.

The figures and accompanying description illustrate example processes and computer-implementable techniques. However, operating environment (or its software or hardware components) contemplates using, implementing, or executing any suitable technique for performing these and other processes. It will be understood that these processes are for illustration purposes only and that the described or similar techniques may be performed at any appropriate time, including concurrently, individually, or in combination. In addition, many of the steps in these processes may take place simultaneously, concurrently, and/or in different orders or combinations than shown. Moreover, operating environment may use processes with additional steps, fewer steps, and/or different steps, so long as the methods remain appropriate.

Aspects of the subject-matter and the operations described in this specification can be implemented in digital electronic circuitry, neuromorphic circuits, analog circuits, or in computer software, firmware, or hardware, including the structures disclosed in this specification and their structural equivalents, or in combinations of one or more of them. Embodiments of the subject-matter described in this specification can be implemented as one or more computer programs, i.e., one or more modules of computer program instructions, encoded on computer storage medium for execution by, or to control the operation of a data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer or computer or processor may be a processor for performing actions in accordance with instructions and one or more memory devices for storing instructions and data. Generally, a computer or computer or processor will also include, or be operatively coupled to receive data from or transfer data to, or both, one or more mass storage devices for storing data, e.g., magnetic, magneto-optical disks, or optical disks. However, a computer or computing device need not have such devices. Moreover, a computer or computing device can be embedded in another device, e.g., a mobile telephone, a personal digital assistant (PDA), a mobile audio or video player, a game console, a Global Positioning System (GPS) receiver, or a portable storage device (e.g., a universal serial bus (USB)

flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject-matter described in this specification can be implemented on a computer having a non-flexible or flexible screen, e.g., a CRT (cathode ray tube), LCD (liquid crystal display) or OLED (organic light emitting diode) monitor, for displaying information to the user and a keyboard and a pointer, e.g., a finger, a stylus, a mouse or a trackball, by which the user can provide input to the computer. Other kinds of devices can be used to provide for interaction with a user as well; for example, feedback provided to the user can be any form of sensory feedback, e.g., touch feedback, visual feedback, auditory feedback, or tactile feedback; and input from the user can be received in any form, including acoustic, speech, touch or tactile input. In addition, a computer or computer or processor can interact with a user by sending documents to and receiving documents from a device that is used by the user; for example, by sending web pages to a web browser on a user's user device in response to requests received from the web browser.

Embodiments of the subject-matter described in this specification can be implemented in a computing system that includes a back-end component, e.g., as a server, or that includes a middleware component, e.g., an application server, or that includes a front-end component, e.g., a user computer having a graphical user interface or a Web browser through which a user can interact with an implementation of the subject-matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the operations recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A system for determining functional synapses from predetermined synapses of connections between two cells in a neuronal circuit, comprising:
 a processor configured to determine, from the predetermined synapses, the functional synapses by:
 admitting, in a first step with a first probability, given structural touches to a second step as potential synapses, followed by
 selecting, with a second probability in the second step, synapses of the potential synapses as predetermined synapses; and
 leaving a portion of the connections unused such that the functional synapses are determined with a third probability from the synapses being selected in the second step, wherein the third probability is independent of a number of the predetermined synapses.

2. The system of claim 1,
 wherein the second probability depends on a number of the potential synapses.

3. The system of claim 2, wherein the first probability is calculated using at least one of experimental data on bouton density, experimental data on a mean number of the synapses per connection and a number of the given structural touches.

4. The system of claim 2, wherein the second probability increases with increasing number of the synapses admitted in the first step to the second step or wherein the second probability is constant for the number of the synapses admitted in the first step to the second step being larger than a cut-off number or wherein the second probability is a monotonically increasing function of the number of potential synapses that approaches zero for the number being lower than the cut-off number and approaches one for the number being larger than the cut-off number.

5. The system of claim 1, wherein the third probability leads to a number of distinct diagrams of the neuronal circuit that is larger than a predetermined threshold and/or wherein the third probability is about 0.5.

6. The system of claim 1, wherein a coefficient of variation of a distribution of a number of the functional synapses per connection is between 0.2 and 0.3.

7. A computer-implemented method for determining functional synapses from predetermined synapses of connections between two cells in a neuronal circuit, comprising:
determining, by one or more computers, the functional synapses from the predetermined synapses by:
admitting, in a first step with a first probability, given structural touches to a second step as potential synapses, followed by
selecting, with a second probability in the second step, synapses of the potential synapses as predetermined synapses; and
leaving a portion of the connections unused such that the functional synapses are determined with a third probability from the synapses being selected in the second step, wherein the third probability is independent of a number of the predetermined synapses.

8. The method of claim 7, wherein the second probability depends on a number of the potential synapses.

9. The method of claim 8, wherein the first probability is calculated using at least one of experimental data on bouton density, experimental data on a mean number of the synapses per connection and a number of the given structural touches.

10. The method of claim 8, wherein the second probability increases with increasing number of the synapses admitted in the first step to the second step or wherein the second probability is constant for the number of the synapses admitted in the first step to the second step being larger than a cut-off number or wherein the second probability is a monotonically increasing function of the number of potential synapses that approaches zero for the number being lower than the cut-off number and approaches one for the number being larger than the cut-off number.

11. The method of claim 7, wherein the third probability leads to a maximum number of distinct diagrams of the neuronal circuit and/or wherein the third probability is about 0.5.

12. The method of claim 7, wherein a coefficient of variation of a distribution of a number of the functional synapses per connection is between 0.2 and 0.3.

13. A non-transitory computer-readable storage medium having computer-executable instructions stored thereon that, when executed by a processor, cause the processor to perform a method for determining functional synapses from predetermined synapses of connections between two cells in a neuronal circuit, comprising:
determining, by one or more computers, the functional synapses from the predetermined synapses by:
admitting, in a first step with a first probability, given structural touches to a second step as potential synapses, followed by
selecting, with a second probability in the second step, synapses of the potential synapses as predetermined synapses; and
leaving a portion of the connections unused such that the functional synapses are determined with a third probability from the synapses being selected in the second step, wherein the third probability is independent of a number of the predetermined synapses.

14. The non-transitory computer-readable storage medium of claim 13, wherein the second probability depends on a number of the potential synapses.

15. The non-transitory computer-readable storage medium of claim 14, wherein the first probability is calculated using at least one of experimental data on bouton density, experimental data on a mean number of the synapses per connection and a number of the given structural touches.

16. The non-transitory computer-readable storage medium of claim 14, wherein the second probability increases with increasing number of the synapses admitted in the first step to the second step or wherein the second probability is constant for the number of the synapses admitted in the first step to the second step being larger than a cut-off number or wherein the second probability is a monotonically increasing function of the number of potential synapses that approaches zero for the number being lower than the cut-off number and approaches one for the number being larger than the cut-off number.

17. The non-transitory computer-readable storage medium of claim 13, wherein the third probability leads to a number of distinct diagrams of the neuronal circuit that is larger than a predetermined threshold and/or wherein the third probability is about 0.5.

18. The non-transitory computer-readable storage medium of claim 13, wherein a coefficient of variation of a distribution of a number of the functional synapses per connection is between 0.2 and 0.3.

19. A system for determining functional synapses from given structural touches between two cells in a neuronal circuit, comprising a processor that is configured to perform the following operations:
admitting, in a first step with a first probability, the given structural touches to a second step as potential synapses, followed by
selecting, with a second probability in the second step, synapses of the potential synapses of connections between the two cells in the neuronal circuit, wherein the second probability depends on a number of the potential synapses, followed by
determining the functional synapses, with a third probability in a third step, from the synapses being selected in the second step by leaving a portion of the connections unused, wherein the third probability is independent of a number of the synapse being selected in the second step.

* * * * *